United States Patent
Ito et al.

[15] 3,657,934

[45] Apr. 25, 1972

[54] SYSTEM FOR CONTROLLING THE SHIFT POINT OF FLUID CONTROLLED AUTOMATIC TRANSMISSION FOR VEHICLES

[72] Inventors: Shin Ito; Seitoku Kubo; Takakazu Mori, all of Toyota, Japan

[73] Assignee: Toyota Jidosha Kogyo Kabushiki Kaisha, Toyota-shi, Japan

[22] Filed: May 18, 1970

[21] Appl. No.: 38,288

[30] Foreign Application Priority Data

July 26, 1969 Japan..............................44/59106

[52] U.S. Cl.........................................74/861, 74/866
[51] Int. Cl............................................B60k 21/00
[58] Field of Search.............................74/861, 866

[56] References Cited

UNITED STATES PATENTS

| 3,439,564 | 4/1969 | Scholl et al. | 74/866 |
| 3,478,851 | 11/1969 | Smyth et al. | 74/866 |

*Primary Examiner*—C. J. Husar
*Attorney*—Cushman, Darby & Cushman

[57] ABSTRACT

A system for controlling the shift point of a fluid controlled automatic transmission in which means are provided so that a shift from one gear position to another takes place at a lower slip ratio of the torque converter when the throttle valve opening is less than a predetermined setting and at a higher slip ratio of the torque converter when the throttle valve opening is more than the predetermined setting.

5 Claims, 24 Drawing Figures

Patented April 25, 1972
3,657,934
13 Sheets-Sheet 1
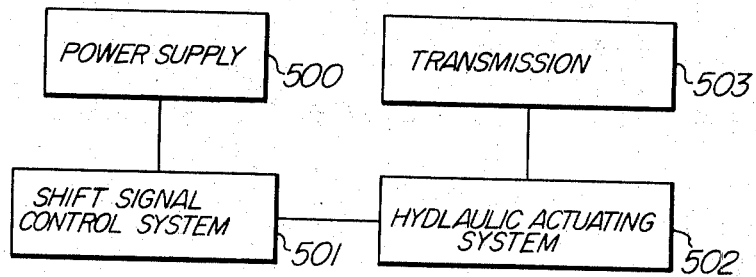
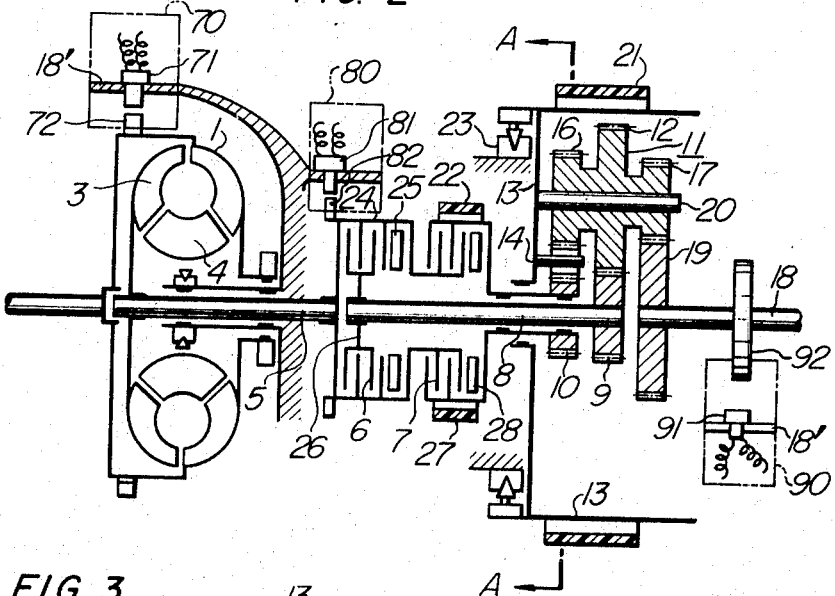
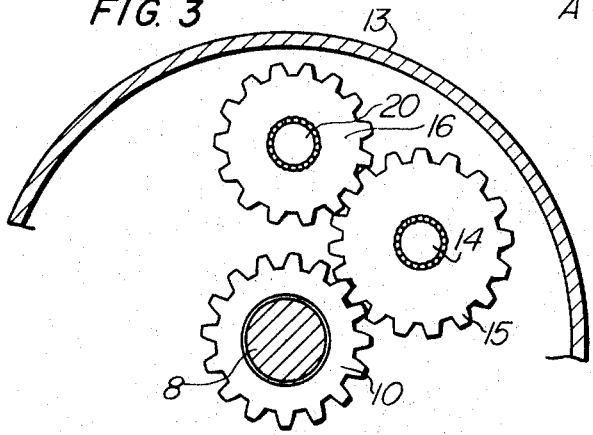
INVENTORS
SHIN ITO
SEITOKU KUBO
TAKAKAZU MORI
BY Cushman, Darby & Cushman
ATTORNEYS

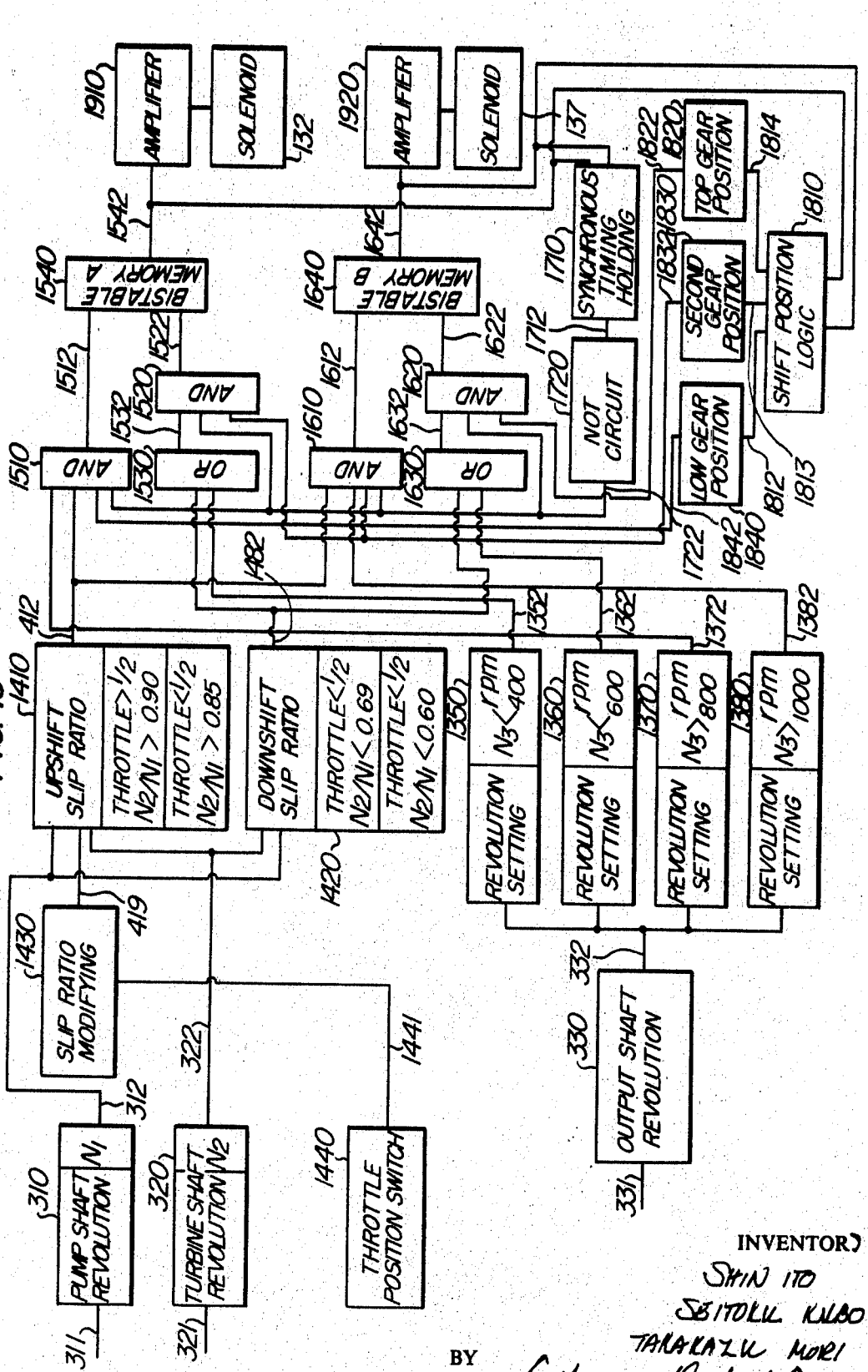

Patented April 25, 1972

INVENTORS
SHIN ITO
SEITORU KUBO
TAKAKAZU MORI

BY Cushman, Darby & Cushman
ATTORNEYS

INVENTORS
SHIO ITO
SEITOKU KUBO
TAKAKAZU MORI
BY Cushman, Darby & Cushman
ATTORNEYS 3,657,934

SYSTEM FOR CONTROLLING THE SHIFT POINT OF FLUID CONTROLLED AUTOMATIC TRANSMISSION FOR VEHICLES

BACKGROUND OF THE INVENTION

1. Field of the Invention

This invention relates to the art of controlling the automatic shift point of an automatic torque converter transmission for automotive vehicles and the like.

2. Description of the Prior Art

Generally, an automatic torque converter transmission comprises a hydraulic torque converter, multi-speed gear means and shift control means for automatically shifting the gear position of the multi-speed gear means. Various methods were proposed in the past for controlling the automatic shift point of the automatic transmission so as to shift the gear position of the multi-speed gear means by the shift control means with suitable timing. One of the methods most commonly employed in the art comprised controlling the automatic shift point depending on the throttle position or the negative pressure in the air intake pipe and the vehicle's speed. An improved method over this prior art method was described in U.S. applications Nos. 855,510 and 855,606 (granted as U.S. Pat. No. 3,572,168) according to which the automatic shift point is controlled depending on the speed ratio of the torque converter, that is, the ratio between the rotational speed of the pump and the turbine of the torque converter. However, the method of controlling the automatic shift point depending on the speed ratio of the torque converter has been defective as is apparent from a shift diagram shown in FIG. 11 in that the automatic shift point is relatively independent of the throttle position and a shift occurs at substantially a constant vehicle speed. As will be seen from the shift diagram shown in FIG. 11, the vehicle speed at which a small depression of the accelerator pedal causes an upshift does not differ appreciably from the vehicle speed at which strong depression of the accelerator pedal causes a similar upshift.

SUMMARY OF THE INVENTION

With a view to attaining further improvements in the method of controlling the automatic shift point depending on the speed ratio of the torque converter, the present invention contemplates the provision of a novel and improved method of controlling the automatic shift point so that it conforms more to the practical requirements. More precisely, the present invention contemplates the provision of a method in which the signal representative of the throttle position is additionally utilized for the control of the shift point so that the shift point can also be varied depending on the throttle position. For example, the shift point is shifted to a larger value than the normal value in the range in which the throttle valve opening exceeds a predetermined value.

In accordance with one aspect of the present invention, there is provided a method of controlling the shift point of a fluid controlled automatic transmission for a vehicle equipped with an engine, a hydraulic torque converter, gear means operatively connected with said torque converter, frictionally engaging means for accomplishing the selective meshing engagement of the gears in said gear means, and means for controlling the automatic shift point of said gear means on the basis of a predetermined setting of the ratio between the rotational speed of the input and output shafts of said torque converter, said method comprising changing the setting of the ratio between the rotational speed of the input and output shafts of said torque converter depending on the load on said engine so as thereby to suitably change the automatic shift point depending on the load on the said engine.

In accordance with another aspect of the present invention, there is provided a system for controlling the shift point of an automatically controlled fluid transmission for vehicles comprising an engine, a hydraulic torque converter operatively connected with the output shaft of said engine, gear means operatively connected with said torque converter for carrying out an automatic shift, frictionally engaging means for accomplishing the selective meshing engagement of the gears in said gear means, first revolution detecting means for detecting the revolution of the input shaft of said torque converter, second revolution detecting means for detecting the revolution of the output shaft of said torque converter, slip ratio signal generating means for computing the ratio between the rotational speed of the input and output shafts of said torque converter, that is, the slip ratio of said torque converter in response to reception of the revolution signals detected by said first and second revolution detecting means and generating an electrical signal representative of said slip ratio, electrical control means operative in response to the electrical signal representative of said slip ratio to generate an electrical signal for applying shifting instructions to said frictionally engaging means for carrying out an automatic shift, electrical signal generating means for generating an electrical signal representative of the load on said engine, and means for modifying the electrical signal representative of the slip ratio of said torque converter depending on the electrical signal representative of the load on said engine so as thereby to change the automatic shift point of said gear means depending on the load on said engine.

A fluid coupling may be employed in lieu of the hydraulic torque converter in the system of the present invention without departing from the spirit of the present invention.

As will be understood from the above description, the present invention is featured by the fact that the automatic shift point is suitably changed depending on the degree of depression of the accelerator pedal, hence the load on the engine. This is advantageous in that, when the driver depresses the accelerator pedal in order to obtain a large accelerating force, the low gear position giving a relatively large accelerating force can be maintained up to a high speed range and thus a shift pattern adjusted to the needs of the driver can be obtained. The same thing also applies to a downshift, in which case the gear can easily be shifted down to provide a further larger accelerating force. In the present invention, further, the speed ratio determining the shift point is set at a relatively small value in the range in which the throttle valve opening is less than a predetermined value. This is advantageous in that, when the driver does not need such a great accelerating force, the gear is upshifted at a relatively low vehicle speed so as to drive the vehicle in a high gear position which is economical.

While the present invention intends to attain the above features by the use of a relatively simple electrical circuit, it will be understood that the same features can be attained by the use of a hydraulic circuit. However, for illustrative purpose, an electrical circuit is employed in an embodiment of the present invention described in detail hereunder.

BRIEF DESCRIPTION OF THE DRAWINGS

FIG. 1 is a block diagram of an automatic transmission according to the present invention.

FIG. 2 is a schematic sectional view of a transmission unit in the automatic transmission.

FIG. 3 is a partially sectional view taken on the line A — A in FIG. 2, showing in detail the relation between an idler gear not shown in FIG. 2 and a reverse sun gear and a planet pinion.

FIG. 13 is a block diagram showing the structure of a shift signal control system in an embodiment of the present invention.

DESCRIPTION OF THE PREFERRED EMBODIMENT

Figure 4:
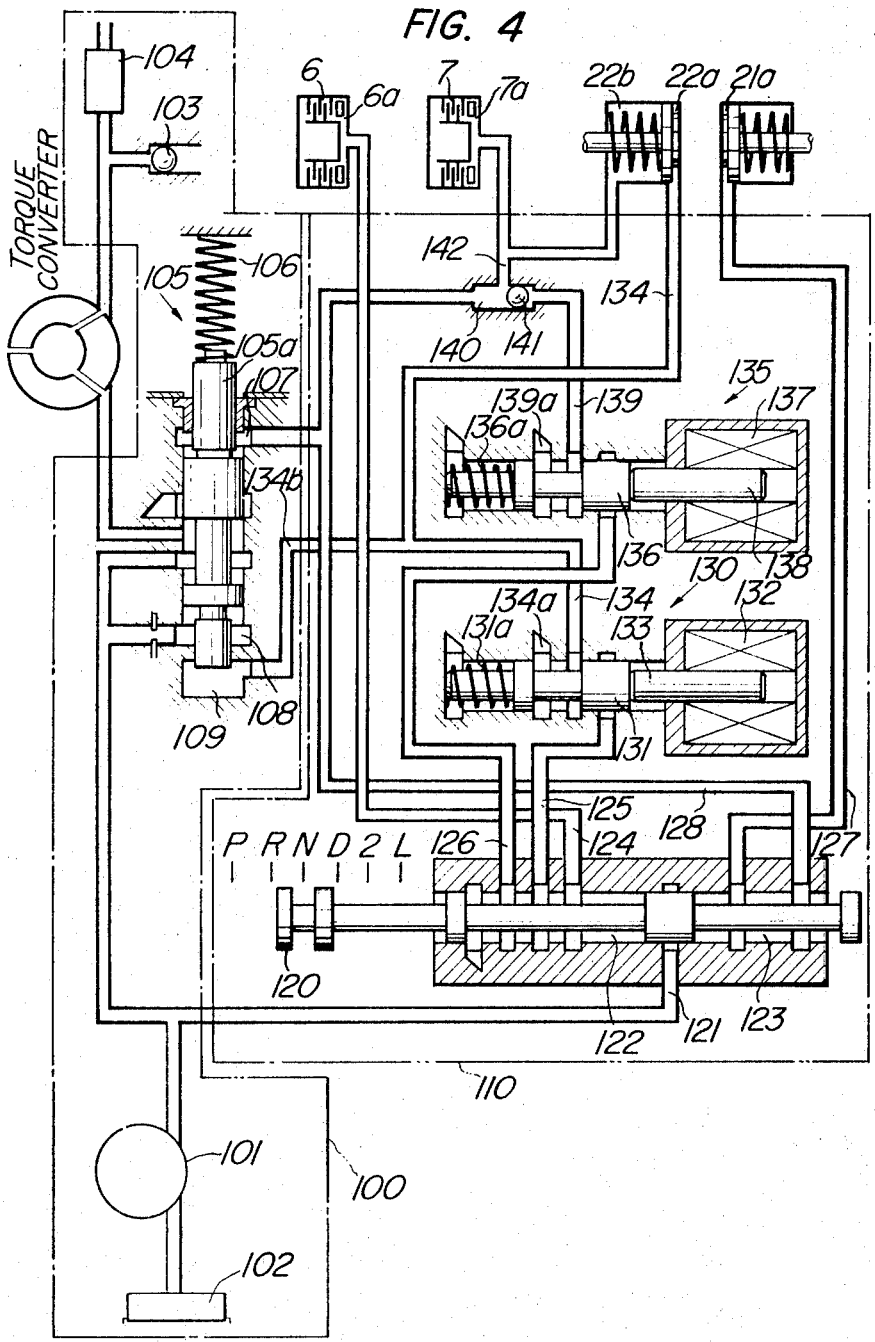
FIGS. 4 through 10 are diagrammatic views illustrating the operation of a hydraulic actuating circuit when the present invention is adapted to a three-forward speed automatic transmission in which the hydraulic actuating circuit is shown in its N position, D position-1st speed, D position-2nd speed, D position-3rd speed, 2 position-2nd speed, L position and R position, respectively.

The structure of an automatic transmission according to the present invention is shown in a block diagram in FIG. 1. Briefly, the automatic transmission comprises an electric power supply 500, a shift signal control system 501, a hydraulic actuating system 502 and a transmission 503. The structure of these systems will be described in detail hereunder.

STRUCTURE OF THE TRANSMISSION

An automatic torque converter transmission having three forward speeds and one reverse speed as shown in FIG. 2 will be taken as a typical example of an automatic transmission system. In FIG. 2, the structure of such a fluid controlled automatic transmission is schematically shown.

A torque converter unit includes a pump impeller 2 directly coupled to a crankshaft 1 of an engine. The power developed by the engine is transmitted from the pump impeller 2 to a turbine impeller 3 through the medium of an hydraulic fluid, and the fluid is returned to re-enter the pump impeller 2 by being guided by a stator 4. A rotational force can be continuously derived from a turbine shaft 5 by the repetition of the above flow of the fluid. This rotational force is transmitted from the turbine shaft 5 to a gear unit disposed at the output side of the torque converter unit. As is commonly known, multiple disc clutch means 6 and 7 and brake band means 21 and 22 are automatically controlled by the fluid pressure supplied from associated servo means as required and cooperate with a planetary gear mechanism to provide three forward speeds and one reverse speed.

The structure of the gear unit disposed at the output side of the torque converter unit will now be described. The turbine impeller 3 is connected to the turbine shaft 5 which acts as a power input shaft of the planetary gear mechanism. The turbine shaft 5 is splined to a drum 24 for unitary rotation therewith. Disposed within the drum 24 is a multiple disc clutch 6 (hereinafter to be referred to as a front clutch) which is engaged by means of a piston 25 actuated by fluid pressure and that is released by means of back-up springs. The drive plates of the front clutch 6 are externally splined to engage the internally splined portion of the drum 24, and the clutch discs are internally splined to engage the externally splined portion of a hub 26 so as to be locked against free rotation. The hub 26 is internally splined to engage the externally splined portion of an intermediate shaft 8. The clutch discs of a multiple disc clutch 7 (hereinafter to be referred to as a rear clutch) are internally splined to engage the externally splined portion of the front clutch drum 24 as shown so as to be locked against free rotation. Thus, the clutch discs of the rear clutch 7 rotate in unison with the front clutch drum 24. The driven plates of the rear clutch 7 are externally splined to engage the internally splined portion of a clutch drum 27 of the rear clutch 7. The rear clutch 7 is engaged by means of a fluid pressure actuated piston 28 and disengaged when the fluid pressure applied to the piston 28 is released.

The intermediate shaft 8 which is splined to the hub 26 of the front clutch 6 is connected at its rear end to an input sun gear 9. The rear clutch drum 27 is fixed to a reverse sun gear 10 by a suitable locking means. The input sun gear 9 meshes with each gear 12 of a plurality of, for example, two or three planet pinions 11. The reverse sun gear 10 meshes with idler gears 15 (shown in FIG. 3) which are each rotatably mounted on a pin 14 fixed at one end to a carrier 13, and the idler gears 15 in turn mesh with gears 16 of the planet pinions 11.

The rearmost gear 17 of each planet pinion 11 meshes with a gear 19 mounted at the front end of an output shaft 18 of the transmission. The planet pinions 11 having the gears 16, 12 and 17 and the idler gears or pinions 15 are carried by the carrier 13 by means of pinion pins 20 and 14, respectively. A brake band (hereinafter to be referred to as a rear brake band) encircles the carrier 13 for applying a brake to the carrier 13, and thus the carrier 13 can be fixed against rotation and allowed to freely rotate by fastening and releasing the rear brake band 21. Similarly, a brake band 22 (hereinafter to be referred to as a front brake band) encircles the rear clutch drum 27 so that the rear clutch drum 27, hence the sun gear 10 can be fixed against rotation and allowed to freely rotate by fastening and releasing the front brake band 22. A one-way clutch 23 associated with the carrier 13 functions in a manner similar to the rear brake band 21 in low gear as set forth hereunder.

With the above structure, three forward speeds and one reverse speed can be obtained by selectively actuating the elements described above in a manner as follows:

First speed — The front clutch 6 and the rear brake band 21 are actuated. (However, when the transmission is driven from the engine, the rear brake band 21 may not be actuated since the one-way clutch 23 is actuated to give the same result as that obtained with the actuation of the rear brake band 21. In this case, however, no driving force is transmitted to the engine from the output shaft 18.) With the front clutch 6 and the rear brake band 21 so actuated, the rotation of the turbine shaft 5 is directly transmitted to the input sun gear 9 through the front clutch 6. Due to the fact that the carrier 13 is locked against rotation by the rear brake band 21, the pinion pins 20 are also held stationary and the rotation of the turbine shaft 5 is transmitted from the gear 9 to the gears 12, thence through the gears 17 to the gear 19 on the output shaft 18 in a speed reducing relation similar to that of an ordinary gear train, thereby providing the first speed.

Second speed — The front clutch 6 is kept actuated and the front brake band 22 is actuated while releasing the rear brake band 21. Thus, the input sun gear 9 is rotated in unison with the turbine shaft 5, but the rear clutch drum 27, hence the reverse sun gear 10 is locked against rotation by the front brake band 22. In this state, the rotation of the turbine shaft 5 is directly transmitted to the input sun gear 9, and the sun gear 9 urges the pinions 11 to rotate in a direction (counterclockwise) opposite to the direction of rotation (clockwise) of the turbine shaft 5. The planet pinions 11 rotating in this direction tend to rotate the idler gears 15 clockwise through the gears 16. However, due to the fact that the gear 10 meshing with the gears 15 is locked against rotation, the pinion pins 14 revolve clockwise around the gear 10. This revolving motion is imparted to the rotation of the input sun gear 9 and the gear 19 carried by the output shaft 18 which gears are coaxial with and rotate in the same direction as the turbine shaft 5.

Since the number of teeth of the gear 12 is selected to be greater than the number of teeth of the gear 17, the number of revolutions of the intermediate shaft 8 is greater than that of the output shaft 18. In other words, the output shaft 18 is rotated at a reduced speed or second speed.

Third speed — The third speed can be obtained by engaging both the front and rear clutches 6 and 7. The input sun gear 9 and the reverse sun gear 10 are rotated in unison and the whole planetary gear system is unitarily rotated so that the output shaft 18 is rotated at the speed of rotation of the turbine shaft 5.

Reverse — When reversing, the rear clutch 7 and the rear brake band 21 are actuated. The carrier 13, hence the pinion pins 14 and 20 are thereby locked against revolution, and the rotation of the turbine shaft 5 is transmitted through the rear clutch 7 to the reverse sun gear 10, thence through the pinions 15 and 17 to the gear 19 mounted on the output shaft 18 so that the output shaft 18 is rotated in the reverse direction.

HYDRAULIC ACTUATING SYSTEM

The arrangement of a hydraulic actuating system preferably used in the present invention is diagrammatically shown in FIGS. 4 through 10. Briefly, the hydraulic actuating system comprises a fluid pressure source 100 and a hydraulic actuating circuit 110. The hydraulic actuating circuit 110 includes a manual valve 120, a 1 – 2 shift means 130, a 2 – 3 shift means 135, a check valve 140 and fluid passages. The fluid pressure source 100 includes an oil pump 101, an oil strainer 102, a pressure regulator valve 105, a check valve 103, an oil cooler 104 and fluid passages. The fluid pressure source 100 functions to supply fluid under pressure to the torque converter, to the gears for lubricating the same and to the hydraulic actuating circuit 110.

Figure 5:
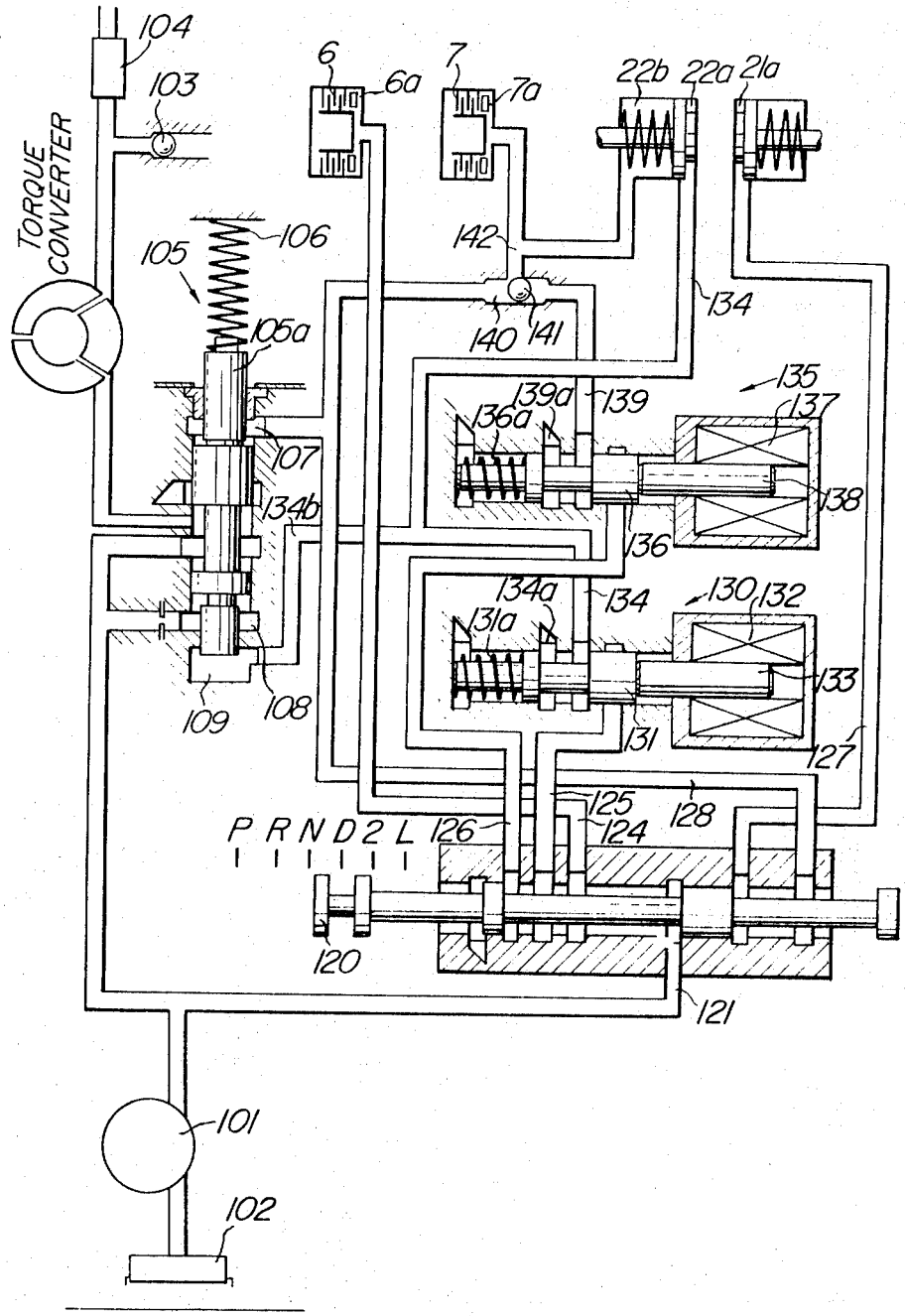

The manual valve 120 is connected with a shift lever (not shown) disposed adjacent to the driver's seat and takes one of P, R, N, D, 2 and L positions. When now the manual valve 120 takes the N position, a fluid passage 121 is closed and valve chambers 122 and 123 are exhausted as seen in FIG. 4. At the D position of the manual valve 120, the fluid passage 121 communicates with fluid passages 124, 125 and 126 as seen in FIG. 5. The fluid passage 124 leads directly to a front clutch servo chamber 6a, and the fluid passage 125 leads to the apply side 22a of a servo for the front brake band 22 through the 1 – 2 shift means 130, while the fluid passage 126 leads to a rear clutch servo chamber 7a and to the release side 22b of the servo for the front brake band 22 through the 2 – 3 shift means 135 and the check valve 140. The 1 – 2 shift means 130 includes a 1 – 2 shift valve element 131 and a solenoid 132. One end (or the right-hand end as viewed in the drawing) of the valve element 131 is abutted by a moving core 133 of the solenoid 132. When no current is supplied to the solenoid 132, the valve element 131 is urged to its rightward position by a spring 131' engaging the other or left-hand end of the valve element 131 so that the fluid passage 125 communicates with a fluid passage 134 to supply fluid to the apply side 22a of the servo for the front brake band 22 to apply the front brake band 22. When current is supplied to the solenoid 132, the moving core 133 urges the valve element 131 to the leftward position by being actuated by the electro-magnetic force of the solenoid 132 so that communication between fluid passages 125 and 134 is interrupted and the fluid passage 134 communicates with a pressure discharge port 134a to release the front brake band 22. Similarly, the 2 – 3 shift means 135 includes a 2 – 3 shift valve element 136 and a solenoid 137. One end (or the right-hand end as viewed in the drawing) of the valve element 136 is engaged by a moving core 138 of the solenoid 137. When no current is supplied to the solenoid 137, the valve element 136 is urged to its rightward position by a spring 136' engaging the other or left-hand end of the valve element 136 so that the fluid passage 126 communicates with a fluid passage 139 to force a check ball element 141 of the check valve 140 toward the fluid passage 128 to block the fluid passage 128.

As a result, the fluid passage 139 communicates with a fluid passage 142 to supply fluid to the rear clutch servo chamber 7a and to the release side 22b of the servo for the front brake band 22 so as to engage the rear clutch 7 and release the front brake band 22. When current is supplied to the solenoid 137, the valve element 136 is urged leftward so that communication between the fluid passages 126 and 139 is interrupted and the fluid passage 139 communicates with a pressure discharge port 139a to be exhausted.

In the first speed at the drive range position or D position-1st speed shown in FIG. 5, both the solenoids 132 and 137 are energized and the front clutch 6 is solely engaged by the supply of fluid to the front clutch servo chamber 6a through the fluid passage 124. Accordingly, when the transmission is driven from the engine, the one-way clutch 23 is engaged to lock the carrier 13 against rotation so that the first speed can be obtained. In this case, however, no driving force can be transmitted from the output shaft 18 since a freewheeling condition appears.

Figure 6:
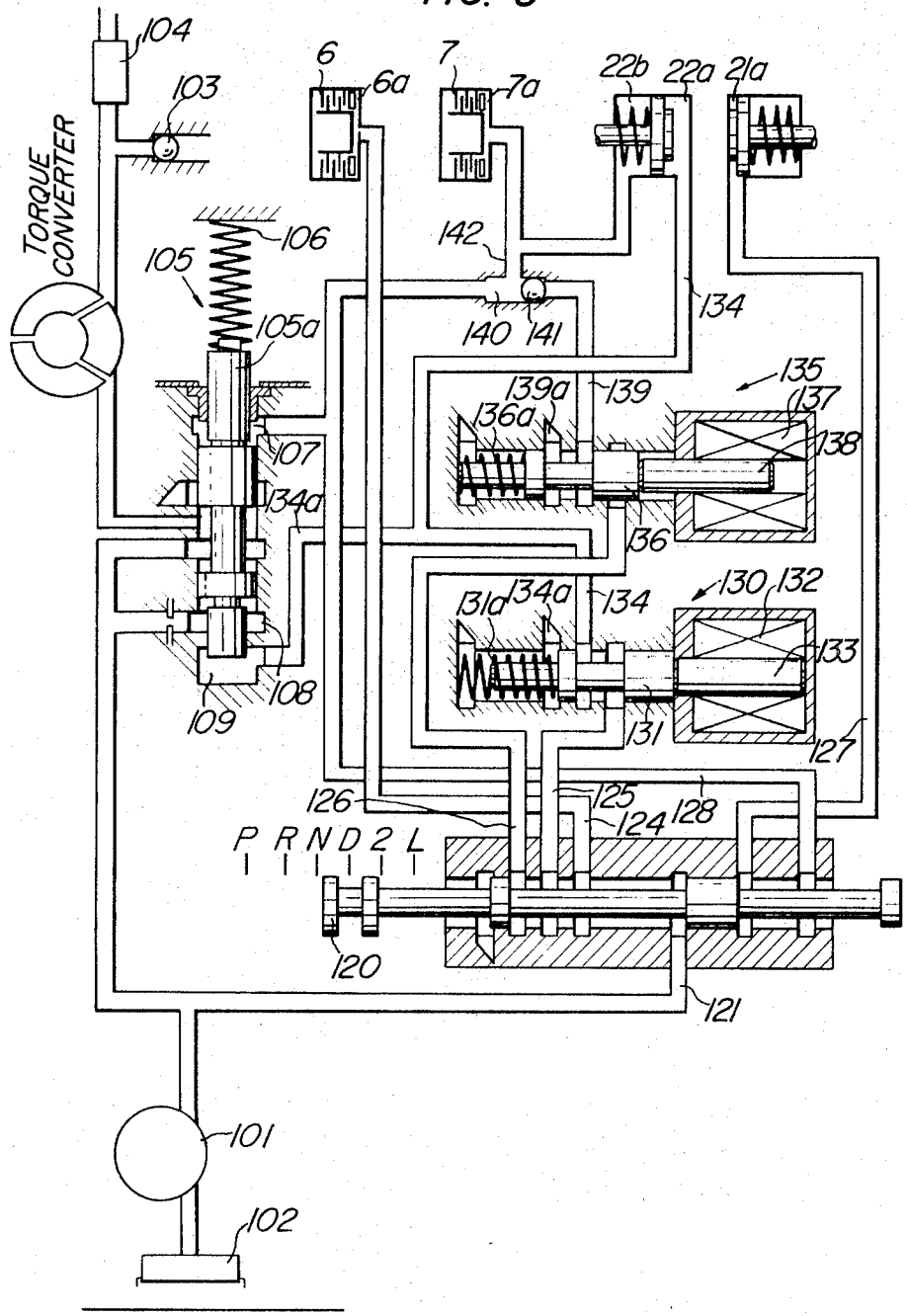

In the second speed at the drive range position or D position-2nd speed shown in FIG. 6, the fluid passage 124 leading to the front clutch servo chamber 6a is kept pressurized and the solenoid 132 for the 1 – 2 shift valve element 131 is de-energized with the result that the fluid passage 125 communicates with the fluid passage 134 to supply fluid to the apply side 22a of the servo for the front brake band 22 to apply the front brake band 22. Thus, the second speed can be obtained.

Figure 7:
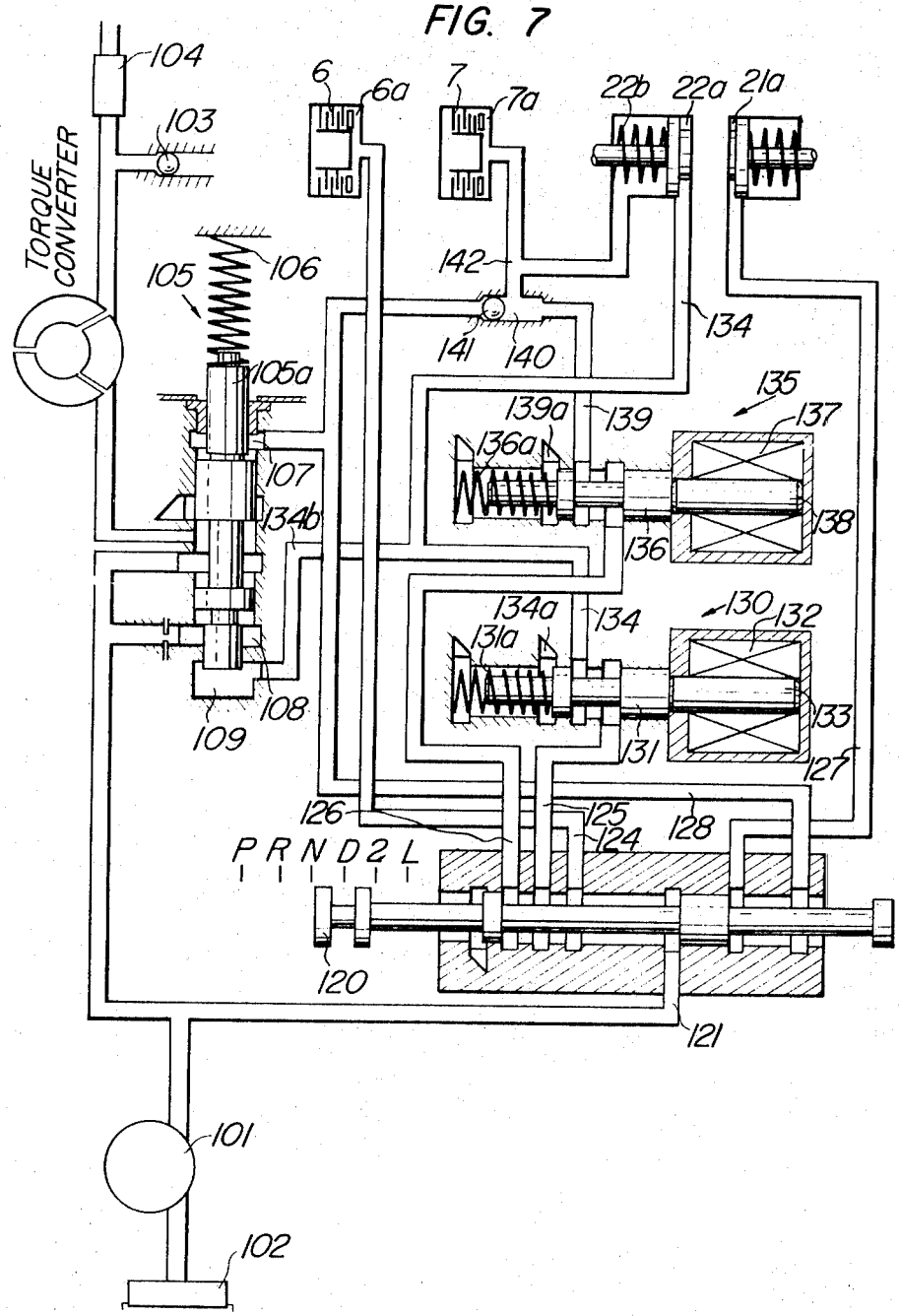

On the third speed at the drive range position or D position-3rd speed shown in FIG. 7, the solenoid 137 for the 2 – 3 shift valve element 136 is de-energized in addition to the previous de-energization of the solenoid 132 in the D position-2nd speed with the result that the fluid passage 126 communicates with the fluid passage 139 to supply fluid to the rear clutch servo chamber 7a to engage the rear clutch 7 while releasing the front brake band 22. Thus, the third speed can be obtained.

Figure 8:
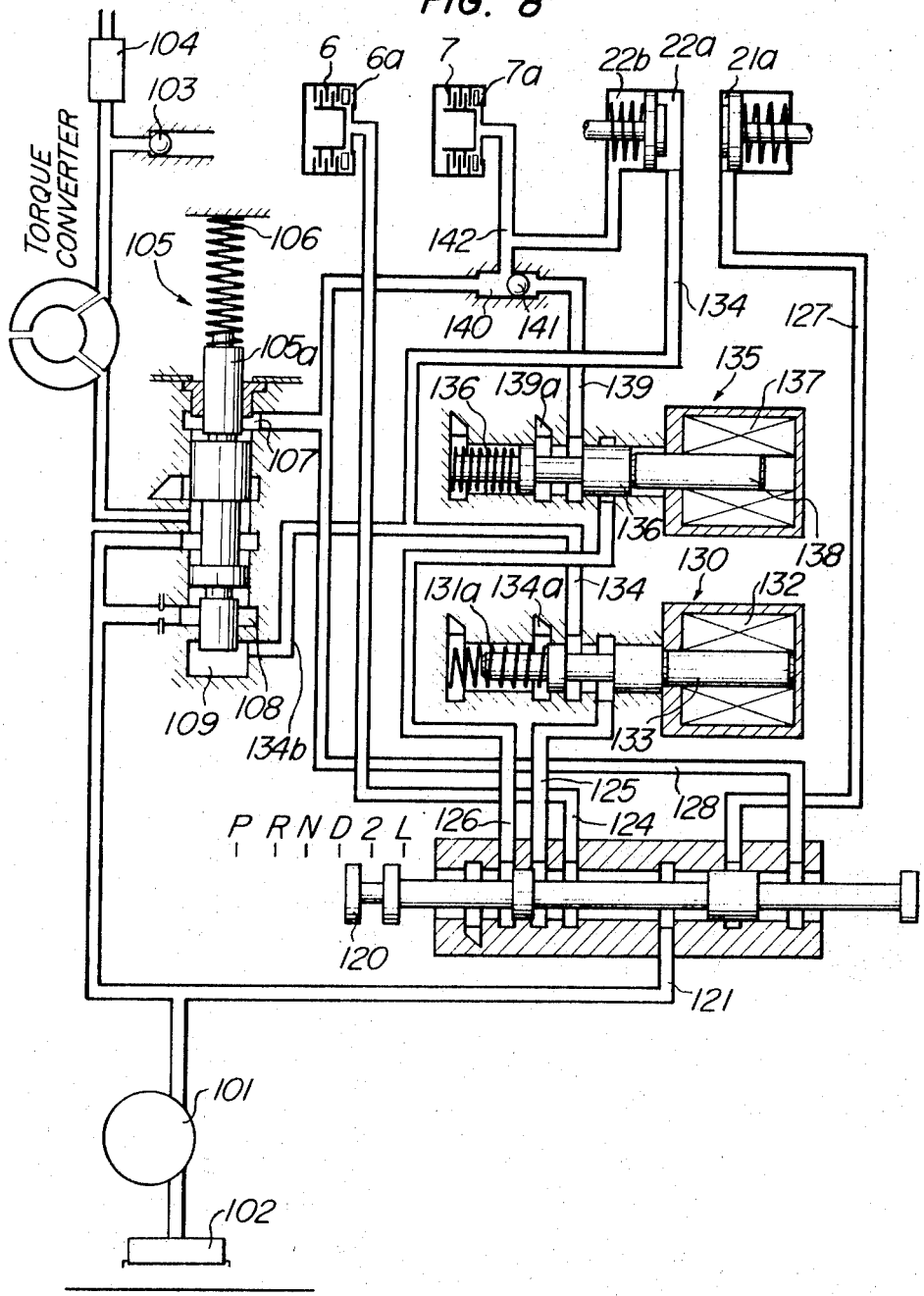

When the manual valve 120 is urged to the 2 position shown in FIG. 8, the fluid passage 126 leading to the 2 – 3 shift means 135 is exhausted and the fluid passages 124 and 125 solely communicate with the fluid pressure source 100. Accordingly, it is impossible to obtain the third speed, regardless of the de-energization of the solenoid 137 for the 2 – 3 shift valve element 136 and the first and second speeds can be obtained depending on the energization and de-energization of the solenoid 132 for the 1 – 2 shift valve element 131.

Figure 9:
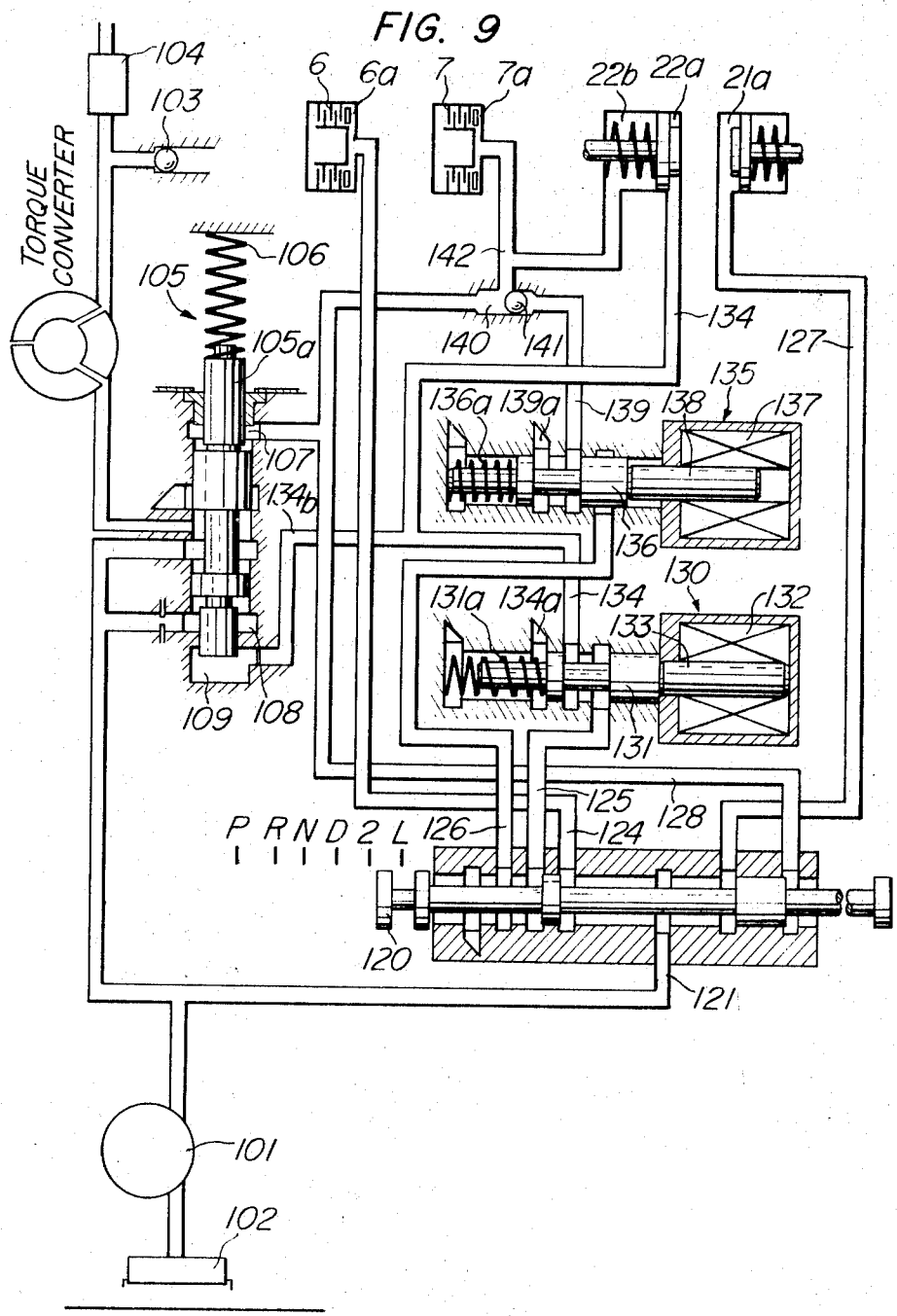

When the manual valve 120 is urged to the L position shown in FIG. 9, the fluid passages 125 and 126 are exhausted and the fluid passages 124 and 127 communicate with the fluid pressure source 100. As a result, fluid is supplied to the front clutch servo chamber 6a and to the apply side 21a of a servo for the rear brake band 21 to engage the front clutch 6 and apply the rear brake band 21. Thus, the first speed can be obtained. The first speed in this case differs from the first speed in the D position in that the rear brake band 21 is applied to provide for transmission of the driving force from the output shaft to the engine thereby allowing for the application of engine braking.

Figure 10:
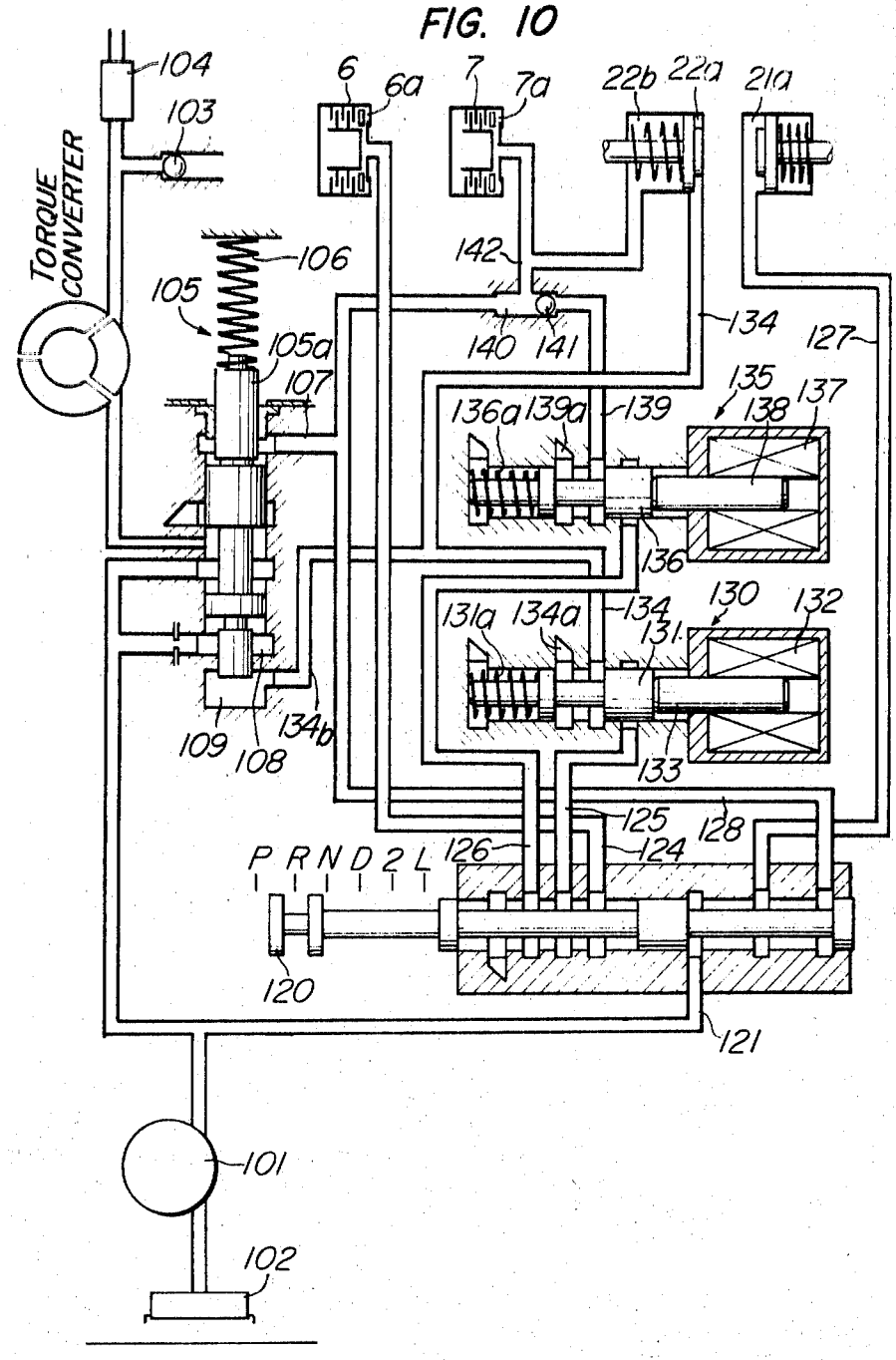

When the manual valve 120 is moved to the R position shown in FIG. 10, the fluid passages 124, 125 and 126 are exhausted and the fluid passages 127 and 128 communicate with the fluid pressure source 100. As a result, fluid is supplied to the rear clutch servo chamber 7a and to the apply side 21a of the servo for the rear brake band 21 to engage the rear clutch 7 and apply the rear brake band 21. Thus, the reverse drive condition for the vehicle can be obtained.

Fluid pressure supplied to the servos is controlled by the pressure regulator valve 105. The pressure regulator valve 105 includes a valve spool 105a which is engaged at one or upper end by a spring 106. In the R position of the manual valve 120, fluid pressure is supplied through a fluid passage 128 to a valve chamber 107 surrounding the upper portion of the valve spool 105a. Spaced valve chambers 108 and 109 surround the lower portion of the valve spool 105a so that fluid pressure is supplied from the oil pump 101 to the chamber 108 and fluid pressure is supplied to the chamber 109 through a fluid passage 134b. In the D or 2 position of the manual valve 120, fluid pressure is supplied to the fluid passage 125 leading to the 1 – 2 shift means 130. Then, when the 1 – 2 shift solenoid 132 is de-energized, the valve element 131 is urged to the upshift position to establish communication between the fluid passages 125 and 134 so that fluid pressure is supplied to the chamber 109 through the fluid passage 134b. On the other hand, the chamber 107 is exhausted in the gear positions with the exception of the reverse position. Thus, a constant low fluid pressure $P_{LL}$ which is determined by the spring pressure of the spring 106 and fluid pressures in the chambers 108 and 109 is produced by the pressure regulator valve 105.

When the manual valve 105 is in the D or 2 position and the 1 – 2 shift valve element 131 is urged to the downshift position (corresponding to the first speed) by the operation of the solenoid 132 or when the manual valve 120 is in the L position, the chamber 109 of the pressure regulator valve 105 is exhausted and a constant fluid pressure $P_L$ which is determined by the spring pressure of the spring 106 and fluid pressure in the chamber 108 is produced by the pressure regulator valve 105. In the R position of the manual valve 120, fluid pressure is supplied to the chamber 107 of the pressure regulator valve 105 through the fluid passage 128. Accordingly, a constant high fluid pressure $P_{LH}$ which is determined by the spring pressure of the spring 106 and fluid pressures in the chambers 107 and 108 is produced by the pressure regulator valve 105.

It will be understood from the above description that the fluid passage 134 leading out from the 1 – 2 shift means 130 is connected to the pressure reducing chamber 109 of the pressure regulator valve 105 so that the fluid pressure produced by the pressure regulator valve 105 is reduced when the 1 – 2 shift valve element 131 is shifted to the high gear position.

The 1 – 2 shift means 130 and 2 – 3 shift means 135 are operated in the manner described above so as to vary the pressure regulating operation of the pressure regulator valve 105 and also to carry out the automatic shift operation. This is accomplished by selectively energizing and de-energizing the solenoids 132 and 137.

REVOLUTION DETECTING MEANS

Means 70 for detecting the rotational speed of the shaft of the torque converter pump includes an r.p.m. detector 71 (which will be described in detail later) mounted on the transmission housing 18' and a toothed disc 72 mounted on the torque converter pump. Suppose that the number of teeth of the toothed disc 72 is $n_1$, then the r.p.m. detector 71 detects an electrical signal S having a frequency which is $n_1$ times the r.p.m. $N_1$ of the torque converter pump. Due to the fact that the rotary shaft of the engine is integrally connected with the shaft of the torque converter pump, the detection of the electrical signal ($S_1 = n_1 N_1$) is equivalent to the detection of the r.p.m. of the engine. Means 80 for detecting the number of revolutions of the shaft 5 of the torque converter turbine includes an r.p.m. detector 81 mounted on the housing 18' and a toothed disc 82 mounted on the front clutch drum 24 which is integral with the shaft 5 of the torque converter turbine. The r.p.m. detector 81 may have a structure similar to that of the r.p.m. detector 71, and the toothed disc 82 may also have a structure similar to that of the toothed disc 72. Suppose that the toothed disc 82 have $n_2$ teeth, for example, $n_2 = 32$, then the r.p.m. detector 81 detects an electrical signal $S_2$ having a frequency which is $n_2$ times the r.p.m. $N_2$ of the turbine shaft 5. Thus, $S_2 = n_2 N_2 = 32 \times N_2$.

Means 90 for detecting the rotational speed of the output shaft 18 includes an r.p.m. detector 91 mounted on the housing 18' and a toothed disc 92 connected integrally with the output shaft 18. The r.p.m. detector 91 may have a structure similar to that of the r.p.m. detectors 71 and 81. Suppose that the number of teeth of the toothed disc 92 is $n_3$, for example, $n_3 = 32$, then the r.p.m. detector 91 detects an electrical signal $S_3$ having a frequency which is $n_3$ times the r.p.m. $N_3$ of the output shaft 18. Thus, $S_3 = n_3 N_3 = 32 \times N_3$. The following relation holds between $S_2$ and $S_3$:

$$S_2 = \chi \, n_2/n_3 \, S_3 \text{ or } S_3 = n_3/n_2 \chi \, S_2$$

where $\chi = N_2/N_3$ (speed change ratio). It will thus be understood that the r.p.m. $N_2$ of the shaft 5 of the torque converter turbine can be sought from the r.p.m. $N_3$ of the output shaft 18 by the arithmetic operation described above.

Knowing the r.p.m. $N_3$ of the output shaft 18 enables the speed of the vehicle to be known. Knowing the r.p.m. $N_1$ of the shaft of the torque converter pump enables the r.p.m. of the engine to be known. Knowing the r.p.m. of the shaft 5 of the torque converter turbine enables the r.p.m. ratio between the shaft of the torque converter pump and the shaft 5 of the torque converter turbine to be determined. This means that the slip ratio of the torque converter is known. It is thus possible to detect the state of power transmission in the torque converter in a specified state.

By way of example, the structure of the means 90 for detecting the r.p.m. of the output shaft 18 will be described with reference to FIGS. 14a and 14b. As seen in a side elevation in FIG. 14a, the toothed disc 92 which is secured at its center of rotation to the output shaft 18 is a discal plate of magnetic material having 32 equally spaced teeth formed along its circumference, and the r.p.m. detector 91 is mounted on the housing 18' at a position closely adjacent to the toothed disc 92 in the diametral direction of the latter. The r.p.m. detector 91 is composed of a permanent magnet 101' and a coil 102' would around the permanent magnet 101'. The permanent magnet 101' and the coil 102' are housed in a suitable casing of non-magnetic material and the casing is mounted on the transmission housing 18' so that one end of the permanent magnet 101' is disposed in close proximity to the outer periphery of the toothed disc 92. As the tooth portion of the toothed disc 92 passes through the magnetic field of the permanent magnet 101' as a result of the rotation of the toothed disc 92, a variation takes place in the leakage flux of the permanent magnet 101' so that an electromotive force is produced in the coil 102'. In the case of the illustrated example, one complete rotation of the toothed disc 92 produces 32 voltage pulses. As previously described, a voltage signal at an A.C. voltage $S_3$ having a frequency $n_3 \times N_3$ is generally obtained when the toothed disc 92 having $n_3$ teeth rotates at a number of revolutions $N_3$ per unit time. The voltage signal appears across output terminals 103'.

The outer peripheral shape of the toothed disc 72 is the means 70 for detecting the number of revolutions of the shaft of the torque converter pump and the toothed disc 82 is the means 80 for detecting the rotational speed of the shaft of the torque converter turbine are similar to that of the toothed disc 92, but the former are mounted relative to the torque converter turbine and the clutch drum in a manner different from the manner of mounting the latter. Output signal voltages $S_1$, $S_2$ and $S_3$ from the three revolution detecting means 70, 80 and 90 are led to leads 311, 321 and 331 in FIG. 13, respectively.

It is a feature of the present invention that the rotational speed $N_1$, $N_2$ and $N_3$ are detected in the form of electrical signals and the electrical signals are used to compute the rotational speed and the revolution ratio so as to issue shifting instructions to the solenoids 132 and 137 in the hydraulic actuating circuit in FIGS. 4 through 10 through a logic circuit according to a predetermined shift pattern thereby to shift the gear position in the gear unit.

SHIFT SIGNAL CONTROL SYSTEM

The control system for determining the shift point (line) has a structure as shown in FIG. 13. The shift signal control system includes a circuit 310 for operating the r.p.m. of the shaft of the torque converter pump, a circuit 320 for operating the r.p.m. of the shaft of the torque converter turbine, a circuit 330 for operating the r.p.m. of the output shaft, two slip operating circuits 1410 and 1420, four r.p.m. setting operating circuits 1350, 1360, 1370 and 1380, four AND circuits 1510, 1520, 1610 and 1620, two OR circuits 1530 and 1630, two bistable memory circuits 1540 and 1640, a synchronous timing holding circuit 1710, a NOT circuit 1720, three gear position circuits 1820, 1830 and 1840, a shift position logic circuit 1810, amplifiers 1910 and 1920, a slip operation modifying circuit 1430, and a throttle position switch circuit 1440.

Figure 14A:
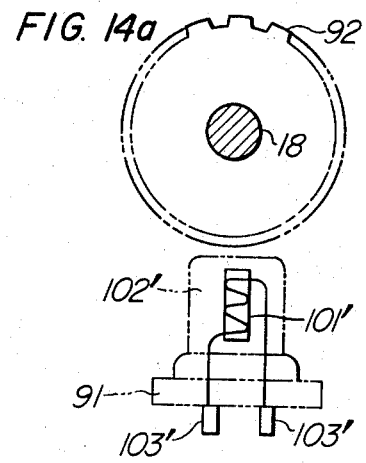
FIGS. 14a and 14b are a side elevational view and a front elevational view, respectively, of revolution detecting means preferably used in the shift signal control system shown in FIG. 13.
Figure 14B:
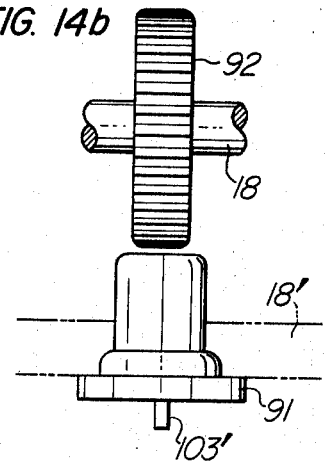
Figure 15:
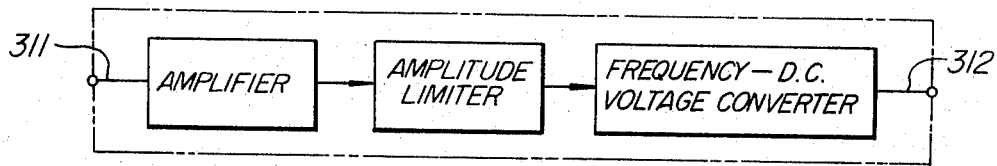
FIG. 15 is a block diagram showing the structure of a digital-analog converter preferably used in the shift signal control system shown in FIG. 13.
Figure 17:
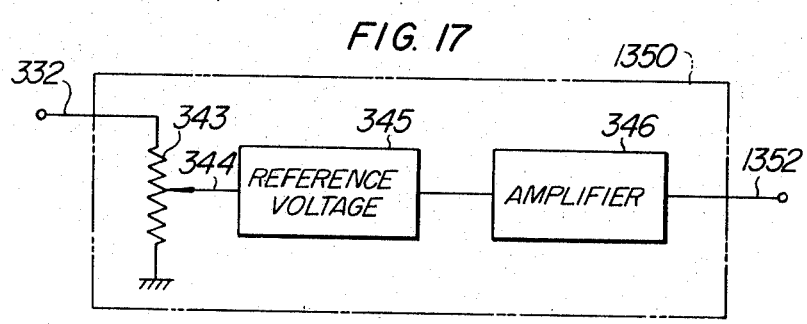
FIG. 17 is a block diagram showing the structure of a revolution setting operating circuit in the system shown in FIG. 13.
Figure 16:
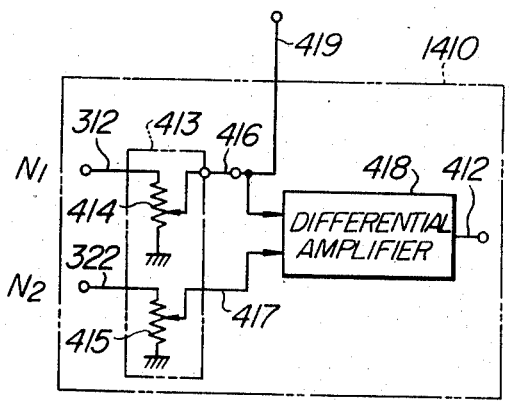
FIG. 16 is a block diagram showing the structure of a slip operating circuit in the system shown in FIG. 13.

The torque converter pump shaft r.p.m. operating circuit 310, torque converter turbine shaft r.p.m. operating circuit 320 and output shaft r.p.m. operating circuit 330 are electrical means as shown in FIG. 15 which includes a frequency detecting and amplifying circuit for converting an A.C. input delivered from the combination of the toothed disc 92, the permanent magnet 101' and the coil 102' wound around the magnet 101' shown in FIGS. 14a and 14b into a D.C. voltage. The r.p.m. setting operating circuits 1350, 1360, 1370 and 1380 are electrical means which includes a potentiometer 343, a reference voltage means 345 and an amplifier 246 as shown in FIG. 17. The slip operating circuits 1410 and 1420 are electrical means which includes two potentiometers 414 and 415 and a differential amplifier 418 as shown in FIG. 16. However, the r.p.m. operating circuits, r.p.m. setting operating circuits and slip operating circuits may be hydraulic or mechanical means in lieu of such electrical means.

Figure 18:
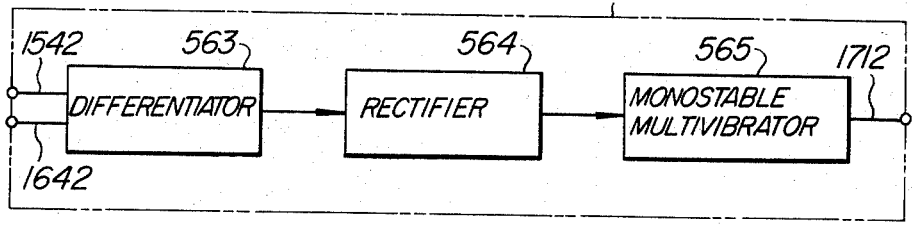
FIG. 18 is a block diagram showing the structure of a synchronous timing holding circuit in the system shown in FIG. 13.
Figure 19:
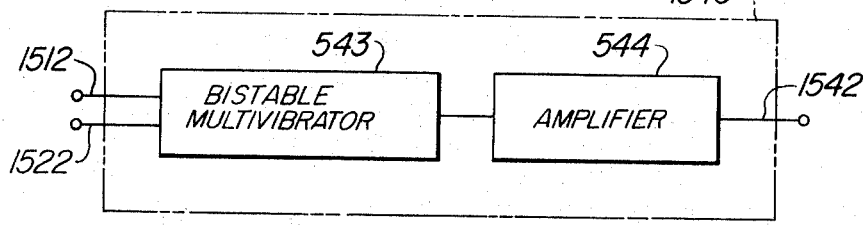
FIG. 19 is a block diagram showing the structure of a bistable memory circuit in the system shown in FIG. 13.

The AND circuits 1510, 1520, 1610 and 1620 may be known ones including a plurality of transistors connected in series with the input circuit. The OR circuits 1530 and 1630 may be known ones including a plurality of transistors connected in parallel with the input circuit. The bistable memory circuits 1540 and 1640 have a structure as shown in FIG. 19 and include a bistable multivibrator 543 and an amplifier 544. The synchronous timing holding circuit 1710 has a structure as shown in FIG. 18 and includes a differentiator 563 for differentiating an input voltage (solenoid voltage) having a square waveform into a differentiated voltage, a rectifier 564 for shaping the waveform to obtain a rectified voltage $f$ and a monostable multivibrator 565 for generating an output voltage $g$ persisting for $t$ seconds. The NOT circuit 1720 is a known one which includes a phase inverter employing therein a one-stage amplifier. The amplifiers 1910 and 1920 are conventional amplifiers. In the illustrated example, the solenoids 132 and 137 are de-energized when the respective bistable memory circuits 1540 and 1640 deliver a signal, while the solenoids 132 and 137 are energized when the respective bistable memory circuits 1540 and 1640 do not deliver any signal.

Figure 20:
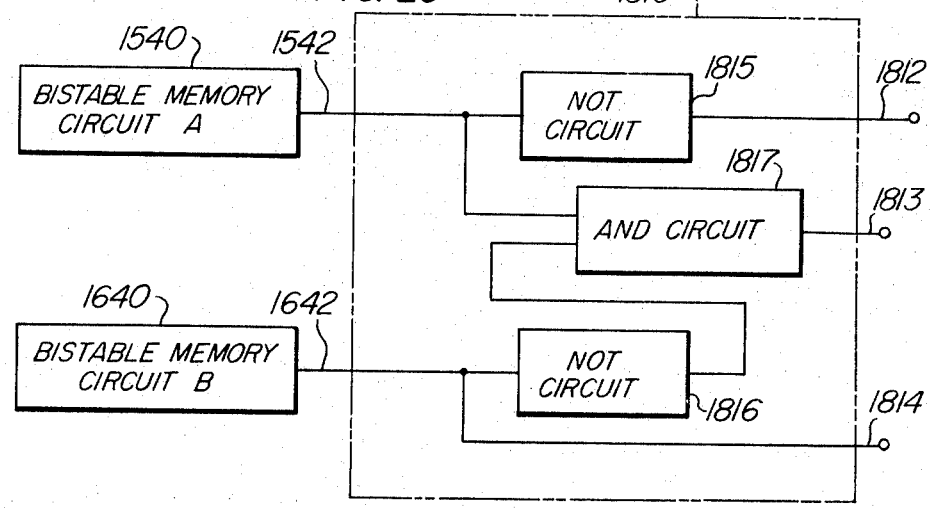
FIG. 20 is a block diagram showing the structure of a shift position logic circuit in the system shown in FIG. 13.

The shift position logic circuit 1810 has a structure as shown in FIG. 20 and is composed of two NOT circuits 1815 and 1816 and an AND circuit 1817. Leads 1542 and 1642 connect the shift position logic circuit 1810 to the respective bistable memory circuits 1540 and 1640. Output signals appear on leads 1812, 1813 and 1814 when both the solenoids 132 and 137 are energized, when the solenoid 132 is de-energized and the solenoid 137 is energized, and when both the solenoids 132 and 137 are de-energized, respectively. Thus, referring to FIG. 13, an output signal appears on the lead 1812 in response to the energization of both the solenoids 132 and 137 and is supplied to the low gear position circuit 1840 from which a low gear position signal appears on a lead 1842, and an output signal appears on the lead 1813 in response to the de-energization of the solenoid 132 and energization of the solenoid 137 and is supplied to the second gear position circuit 1830 from which a second gear position signal appears on a lead 1832, while an output signal appears on the lead 1814 in response to the de-energization of both the solenoids 132 and 137 and is supplied to the top gear position circuit 1820 from which a top gear position signal appears on a lead 1822. Table 1 tabulates the relation between the gear position signals and the state of the solenoids.

TABLE 1

| | Solenoid 132 | Solenoid 137 |
|---|---|---|
| Low gear position signal | Energized | Energized |
| Second gear position signal | Energized | De-energized |
| Top gear position signal | De-energized | De-energized |

Figure 21:
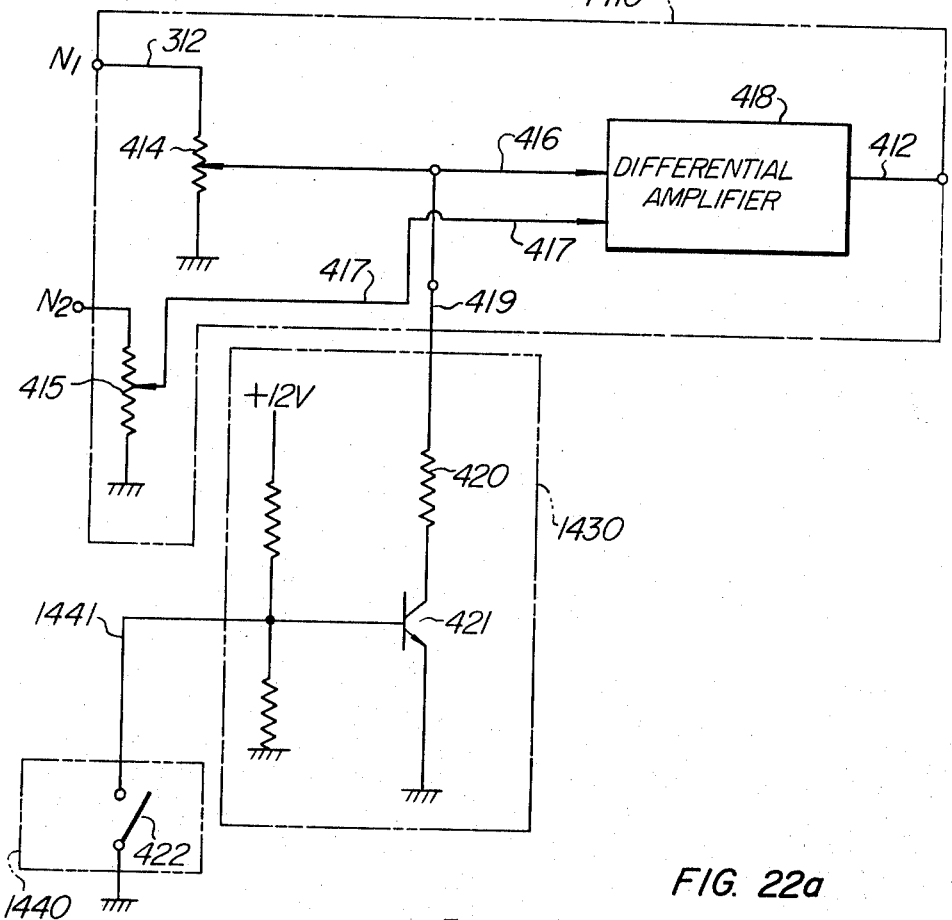
FIG. 21 is a circuit diagram illustrating throttle position switch circuit and a slip operation modifying circuit associated with the slip operating circuit shown in FIG. 16.

FIG. 21 shows the structure of the throttle position switch circuit 1440 and slip operation modifying circuit 1430 for attaining the primary aim of the present invention. The purpose of these circuits is to provide a shift pattern in which the speed ratio of the torque converter giving an upshift or downshift at a throttle valve opening of more than a predetermined value differs from the speed ratio giving such a shift at a throttle valve opening of less than the above setting. More precisely, referring to FIG. 21, a throttle position switch 422 is arranged for an interlocking operation with the engine throttle valve and also with the accelerator pedal so that the switch 422 is urged to its open position at a throttle valve opening of less than a predetermined value, for example, ½ of the full opening. When the switch 422 is urged to the open position, a semiconductor device 421 in the resistance switch-over circuit 1430 conducts to connect a lead 419 to ground through a resistor 420. As a result, the output voltage delivered from the torque converter pump shaft r.p.m. operating circuit 310 through a lead 312 shown in FIG. 16 is divided by a resistor 414 and the resistor 420 connecting the slide arm of the potentiometer to ground. When, on the other hand, the throttle position switch 422 is urged to its closed position due to the fact that the throttle valve opening exceeds the predetermined value, the semiconductor device 421 is cut off to disconnect the resistor 420 from ground. Thus, the output voltage from the circuit 310 is solely divided by the resistor 414 and the voltage appearing on a lead 416 is higher than when the resistor 420 participates in the voltage dividing action.

Figure 22A:
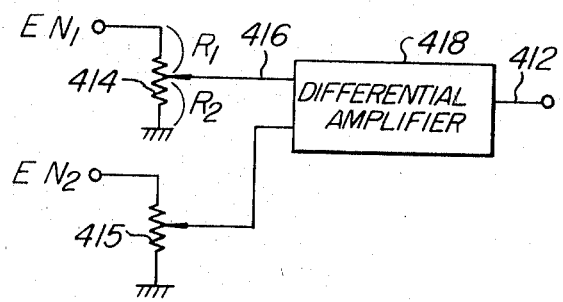
FIGS. 22a and 22b are explanatory views for describing the operation of the slip operation modifying circuit shown in FIG. 21.

The above operation will be described in more detail with reference to FIGS. 22a and 22b. FIG. 22a represents the state in which the throttle valve opening is more than the predetermined value. In this case, the voltage E appearing on the lead 416 is given by:

$$E = E_{N1} \times R_2/(R_1 + R_2) \ldots \quad 1.$$

Figure 22B:
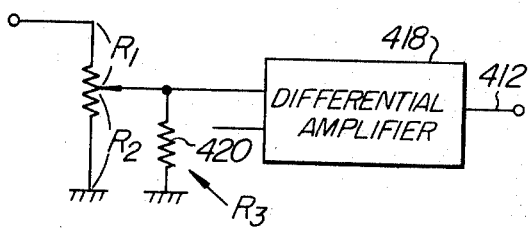

FIG. 22b represents the state in which the throttle valve opening is less than the predetermined value. In this case, the voltage E' appearing on the lead 416 is given by:

$$E' = E_{N1} \times \frac{R_2 \| R_3}{R_1 + R_2 \| R_3} \quad (2)$$

$$= \frac{R_2 R_3}{R_1 R_2 + R_1 R_3 + R_2 R_3} E_{N1} \quad (3)$$

The difference between the voltage E at the throttle valve opening of more than the predetermined value and the voltage E' at the throttle valve opening of less than the predetermined value is given by the following equation:

$$E - E' = \left( \frac{R_2}{R_1 + R_2} - \frac{R_2 R_3}{R_1 R_2 + R_1 R_3 + R_2 R_3} \right) E_{N1} \quad (4)$$

$$= \frac{R_1 R_2^2}{(R_1 + R_2)(R_1 R_2 + R_1 R_3 + R_2 R_3)} E_{N1} > 0 \quad (5)$$

The voltage appearing on the lead 416 is higher by the above difference at the throttle valve opening of more than the predetermined value. Thus, the voltage representative of the pump shaft r.p.m. applied to the differential amplifier 418 in the slip operating circuits 1410 and 1420 is increased by a fixed proportion when the throttle valve opening exceeds the predetermined value. Therefore, in the slip operating circuit 1410, for example, a signal is generated at a slip ratio of more than 0.90 when the throttle valve opening is more than ½ and a signal is generated at a slip ratio of more than 0.85 when the throttle valve opening is less than ½.

SHIFT DIAGRAM

Figure 11:
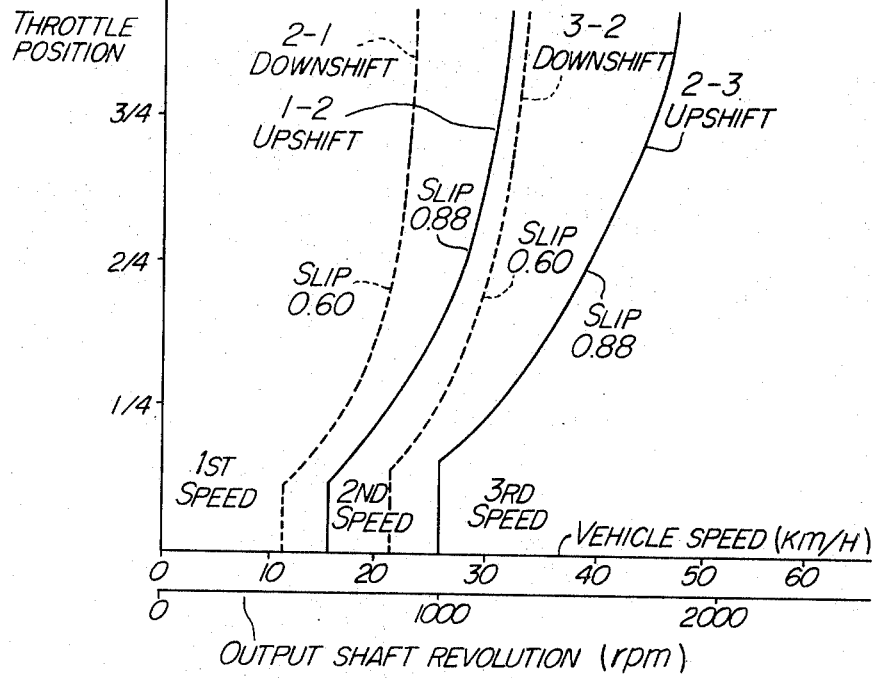
FIG. 11 is a shift diagram according to the prior method of controlling the automatic shift point depending on the slip ratio of the torque converter.
Figure 12:
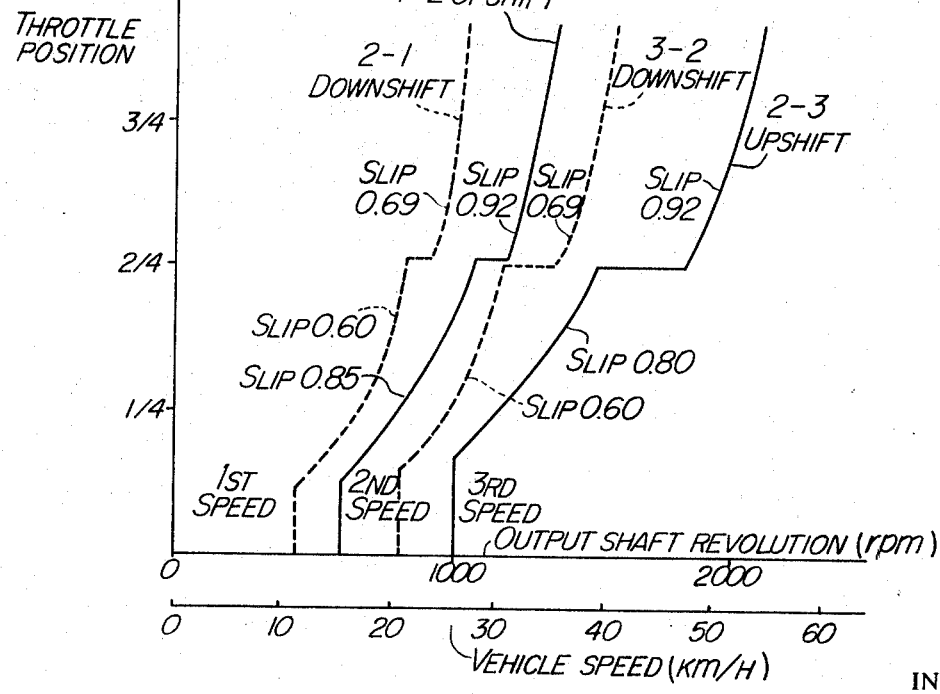
FIG. 12 is an improved shift diagram according to the method of the present invention.

FIGS. 11 and 12 are shift diagrams showing a heretofore employed shift pattern and an improved shift pattern according to the present invention, respectively. It will be seen from FIG. 12 that the ranges of first and second gear are extended to the higher speed side at a large throttle valve opening since a large driving force is required at the high throttle position and the ranges of second and third gear are extended towards the low speed side at a small throttle valve opening, since a silent drive at a sufficiently low rotational speed of the engine and with little fuel consumption is required at a low throttle position. While FIG. 12 shows an example in which the throttle valve opening is divided into two ranges at the value of 2/4 and different speed ratios are provided for these two ranges, it will be apparent that the throttle valve opening may be divided into three ranges and corresponding speed ratios may be provided for these three ranges for obtaining a better performance. In FIGS. 11 and 12, four shift points with fixed vehicle speeds are provided at positions adjacent to zero throttle valve opening besides the shift points with the fixed speed ratios. However, these shift points are provided in order to avoid the disadvantage that a shift occurs may take place at an extremely low speed when the speed ratio is thus fixed, and the provision of these shift points has not any direct concern with the objects of the present invention. Further, it is to be noted that the condition of a fixed speed ratio, for example, 0.85 exists in anyone of the first, second and third speeds. Therefore, it is insufficient to consider that an upshift from the first to second speed occurs at the slip ratio of 0.85 in FIG. 12, and the proper way of thinking is that an upshift from the first to second speed occurs when the speed ratio attains 0.85 in first speed.

OPERATION OF THE CONTROL SYSTEM

Logical Operation for Shift from Low to Second Gear

When the operating state of the torque converter makes a shift to the right-hand side of the 1 – 2 upshift line shown in FIG. 12, a signal is applied from the AND circuit A 1510 to the bistable memory circuit A 1540 through a lead 1512 in FIG. 13 thereby de-energizing the solenoid 132. As a result, the shift valve element 131 is urged to its rightward position in FIG. 5, and the front clutch 6 and front brake band 22 are actuated to shift the gear train from low to second gear. Referring to FIG. 13 again, immediately after the de-energization of the solenoid 132, the signal from the bistable memory circuit A 1540 is supplied to the shift position logic circuit 1810 via a lead 1542, and the shift position logic circuit 1810 supplies an output signal to the second gear position circuit 1830 through the lead 1813. As a result, the second gear position circuit 1830 delivers the second gear position signal which is applied to the AND circuits B 1520 and C 1610. The signal from the bistable memory circuit A 1540 is also applied through the lead 1542 to the synchronous timing holding circuit 1710, which therefore applies a signal for $t$ seconds to the NOT circuit 1720 through a lead 1712, and thus no signal from the NOT circuit 1720 appears on a lead 1722. Thus, one of the signals which is applied to the AND circuit A 1510 disappears and the AND circuit A 1510 ceases to apply its output signal to the bistable memory circuit A 1540, but the solenoid 132 is kept in the de-energized state by the memory action of the bistable memory circuit A 1540. Further, no signal is applied from the NOT circuit 1720 to any of the AND circuits B 1520, C 1610 and D 1620, and thus other shift operation cannot be started for the period of time of $t$ seconds even when other slip ratio signal may be produced. After the period of time of $t$ seconds, the signal applied from the synchronous timing holding circuit 1710 to the NOT circuit 1720 through the lead 1712 disappears and the AND circuits A 1510, B 1520, C 1610 and D 1620 are applied with the signal from the NOT circuit 1720 again. Thus, the system is ready for a subsequent shift of the gear position.

Logical Operation for Shift from Second to Low Gear

When the operating state of the torque converter makes a shift to the left-hand side of the 2 – 1 downshift line in FIG. 12, that is, when, for example, the slip ratio [$N_1/N_2$] is reduced to less than 0.60 at a throttle valve opening of less than ½, a signal appears from the OR circuit A 1530 on a lead 1532 to be applied to the AND circuit B 1520. Since this means that all the required input signals are applied to the AND circuit B 1520, a signal is applied from the AND circuit B 1520 to the bistable memory circuit A 1540 through a lead 1522, and the output signal from the bistable memory circuit A 1540 disappears, resulting in the energization of the solenoid 132 by the amplifier 1910. Thus, the gear position is shifted to low gear. For a period of time of $t$ seconds immediately after the gear train is shifted to the low gear position, the synchronous timing holding circuit 1710 delivers a signal with the result that the signal from the NOT circuit 1720 disappears and other shift operation cannot be carried out for this period of time as described in the above. Further, due to the fact that the signal having appeared from the bistable memory circuit A 1540 on the lead 1542 disappears, the shift position logic circuit 1810 applies a signal to the low gear position circuit 1840, which is thereby actuated to apply the low gear position signal to the AND circuit A 1510 via a lead 1842. After $t$ seconds, the signal from the NOT circuit 1720 appears again and is applied to the AND circuits A 1510, B 1520, C 1610 and D 1620. Thus, the system is ready for a subsequent shift in the gear position.

Logical Operation for Shift from Second to Top Gear

The solenoids 132 and 137 are de-energized for a shift from second to top gear when the operating state of the torque converter makes a shift to the right-hand side of the 2 – 3 upshift line shown in FIG. 12. The 2 – 3 upshift takes place when the signal representative of [$N_2/N_1$] > 0.90 at a throttle valve opening of more than ½ or a signal representative of [$N_2/N_1$] > 0.85 at the throttle valve opening of less than ½ appearing from the slip operating circuit 1410, the signal representative of $N_3$ > 1,000 r.p.m. appearing from the r.p.m. setting operating circuit 1380, the signal appearing from the NOT circuit 1720 and the signal appearing from the second gear position circuit 1830 are all applied to the AND circuit C 1610 in FIG. 13. Immediately after the shifting of the gear position to top gear, the bistable memory circuits A 1540 and B 1640 apply signals to the shift position logic circuit 1810 via the leads 1542 and 1642. The shift position logic circuit 1810 applies a signal to the top gear position circuit 1820 via the lead 1814, and the top gear position signal delivered from the top gear position circuit 1820 is applied to the AND circuit D 1620 via the lead 1822. During the period of time of $t$ seconds immediately after the shifting of the gear position to top gear, the synchronous timing holding circuit 1710 applies its signal to the NOT circuit 1720 so that no signal appears from the NOT circuit 1720. After $t$ seconds, the signal appears again from the NOT circuit 1720 and is applied via the lead 1722 to the AND circuits A 1510, B 1520, C 1610 and D 1620. Thus, the system is ready for a subsequent shift of the gear position.

Logical Operation for Shift from Top to Second Gear

When, for example, the slip ratio [$N_2/N_1$] is reduced to less than 0.60 at the throttle valve opening of less than ½, the slip operating circuit 1420 delivers a signal which is applied to the OR circuit B 1630 via a lead 1482 in FIG. 13. A signal appears from the OR circuit B 1630 and is applied to the AND circuit D 1620 via a lead 1632. Since the signal appearing from the NOT circuit 1720, the top gear position signal appearing from the top gear position circuit 1820 and the signal appearing from the OR circuit B 1630 are all applied to the AND circuit D 1620, a signal appears from the AND circuit D 1620 on a lead 1622. As a result, the signal having been delivered from the bistable memory circuit B 1640 disappears and the solenoid 137 is energized. Since the other solenoid 132 is in its de-energized state, a shift to second gear takes place. Immediately after shifting to second gear, the shift position logic circuit 1810 and the second gear position circuit 1830 are actuated by the signal supplied from the bistable memory circuit 1540 via the lead 1542, and the second gear position signal is applied to the AND circuits B 1520 and C 1610. Since the signal having been applied to the synchronous timing holding circuit 1710 from the bistable memory circuit 1640 via the lead 1642 disappears, the NOT circuit 1720 ceases to deliver its signal for a period of time of $t$ seconds. After $t$ seconds, the signal from the synchronous timing holding circuit 1710 disappears with the result that the NOT circuit 1720 delivers a signal again and this signal is applied to the AND circuits A 1510, B 1520, C 1610 and D 1620. Thus, the system is ready for a subsequent shift in the gear position.

Although the above description has referred to an embodiment in which electrical signals from the r.p.m. setting operating circuits and slip operating circuits are applied to the AND circuits, the present invention also includes a system in which an electrical signal representative of the load on the engine, hence the negative pressure in the air intake pipe or throttle valve opening and an electrical signal representative of the revolution of the engine are applied to the AND circuits for carrying out a shift in the gear position. When there is no need to provide hysteresis between an upshift point to an upper gear position and a downshift point to a lower gear position, only one AND circuit will be required in the logic circuit and the OR circuits and bistable memory circuits are rendered unnecessary. An automatic transmission provided with an electrical control system comprising a single AND circuit, gear position signal generating means and synchronous timing holding means is also included in the scope of the present invention.

While a preferred embodiment of the present invention has been described in the above by way of example, it will be apparent for those skilled in the art that the present invention is in no way limited to such a specific embodiment and many changes and modifications may be made therein without departing from the scope of the appended claims.

What is claimed is:

1. A system for controlling shift points of a fluid controlled automatic transmission for vehicles comprising
   an engine having an output shaft
   a hydraulic torque converter having input and output shafts and being operatively connected with the said output shaft of said engine,
   gear means including selective meshable gears and being operatively connected with said torque converter,
   frictionally engaging means for accomplishing selective meshing engagement of the said gears in said gear means,
   first revolution detecting means for detecting revolutions of the said input shaft of said torque converter,
   second revolution detecting means for detecting revolutions of the said output shaft of said torque converter,
   slip ratio signal generating means for computing a ratio between rotational speeds of the said input and output shafts of said torque converter, that is, the slip ratio of said torque converter in response to reception of revolution signals detected by said first and second revolution detecting means and generating an electric signal representative of said slip ratio,
   electrical control means operative in response to the electric signal representative of said slip ratio to generate an electric signal for applying shifting instructions to said frictionally engaging means for carrying out an automatic shift,
   electric signal generating means for generating an electric signal representative of a load on said engine,
   and means for modifying the electric signal representative of the slip ratio of said torque converter depending on the electric signal representative of the load on said engine so as thereby to change automatic shift points of said gear means depending on the load on said engine.

2. A system as defined in claim 1, wherein said modifying means is means for changing the ratio at which the voltages of said revolution signals to be supplied to said slip ratio signal generating means are divided.

3. A system as in claim 1 wherein said engine has a throttle valve and said electric signal generating means for generating an electric signal responding to the load on said engine is an electric switch responsive to a degree of opening of said throttle valve.

4. A system as defined in claim 3, wherein said modifying means is provided with two ratios at which the voltages of said revolution signals to be supplied to said slip ratio signal generating means are divided and said two voltage ratios are switched by said electric switch.

5. A system for controlling shift points of a fluid controlled automatic transmission for a vehicle having an engine with an output shaft, comprising:
   a hydraulic torque converter (or fluid coupling) having input and output shafts and being adapted for operative connection with the said output shaft of said engine,
   gear means including selective meshable gears and being operatively connected with said torque converter,
   frictionally engaging means for accomplishing selective meshing engagement of gears in said gear means,
   means for generating a signal representative of a slip ratio between the said input and output shafts of said torque converter,
   control means operative in response to the slip ratio signal for supplying a shift command signal to said frictionally engaging means for causing an automatic shift in said gear means,
   means for generating a signal responding to a load on said engine,
   and means for modifying the slip ratio signal of said torque converter by means of the signal responding to the load on said engine so as to thereby change automatic shift points of said gear means depending on the load on said engine.

* * * * *